United States Patent [19]

Miller

[11] 4,198,883
[45] Apr. 22, 1980

[54] PROCESS FOR MANUFACTURING BENT KNIVES

[76] Inventor: Fred L. Miller, 17353 SW. Canal Cir., Lake Oswego, Oreg. 97034

[21] Appl. No.: 940,789

[22] Filed: Sep. 8, 1978

[51] Int. Cl.$^2$ .............................................. B21K 21/00
[52] U.S. Cl. .................................. 74/101 R; 144/241
[58] Field of Search .......... 76/101 A, 101 SM, 101 R, 76/24, DIG. 2; 30/337, 351; 51/5 A, 288; 144/162 R, 218, 230, 220, 240, 241

[56] References Cited

U.S. PATENT DOCUMENTS

| | | | |
|---|---|---|---|
| 3,443,457 | 5/1969 | Nedsten | 76/101 R |
| 3,777,793 | 12/1973 | Miller | 144/220 |
| 4,037,494 | 7/1977 | Hess | 76/101 A |
| 4,082,127 | 4/1978 | Miller | 144/220 |

*Primary Examiner*—Robert Louis Spruill
*Assistant Examiner*—W. D. Bray
*Attorney, Agent, or Firm*—Lee R. Scheremerhorn

[57] ABSTRACT

The manufacture of bent knives for wood cutting machines is simplified and made less expensive by designing the knife so that the finish grinding operation on its opposite faces may be performed before, instead of after, the bending operation on a flat plate. This is made possible by reducing the plate thickness to ¼ inch or less which permits a ratio of radius of bend to plate thickness of at least 2.25. This ratio virtually eliminates breakage of the knives because of abusive processing.

4 Claims, 2 Drawing Figures

U.S. Patent     Apr. 22, 1980     4,198,883
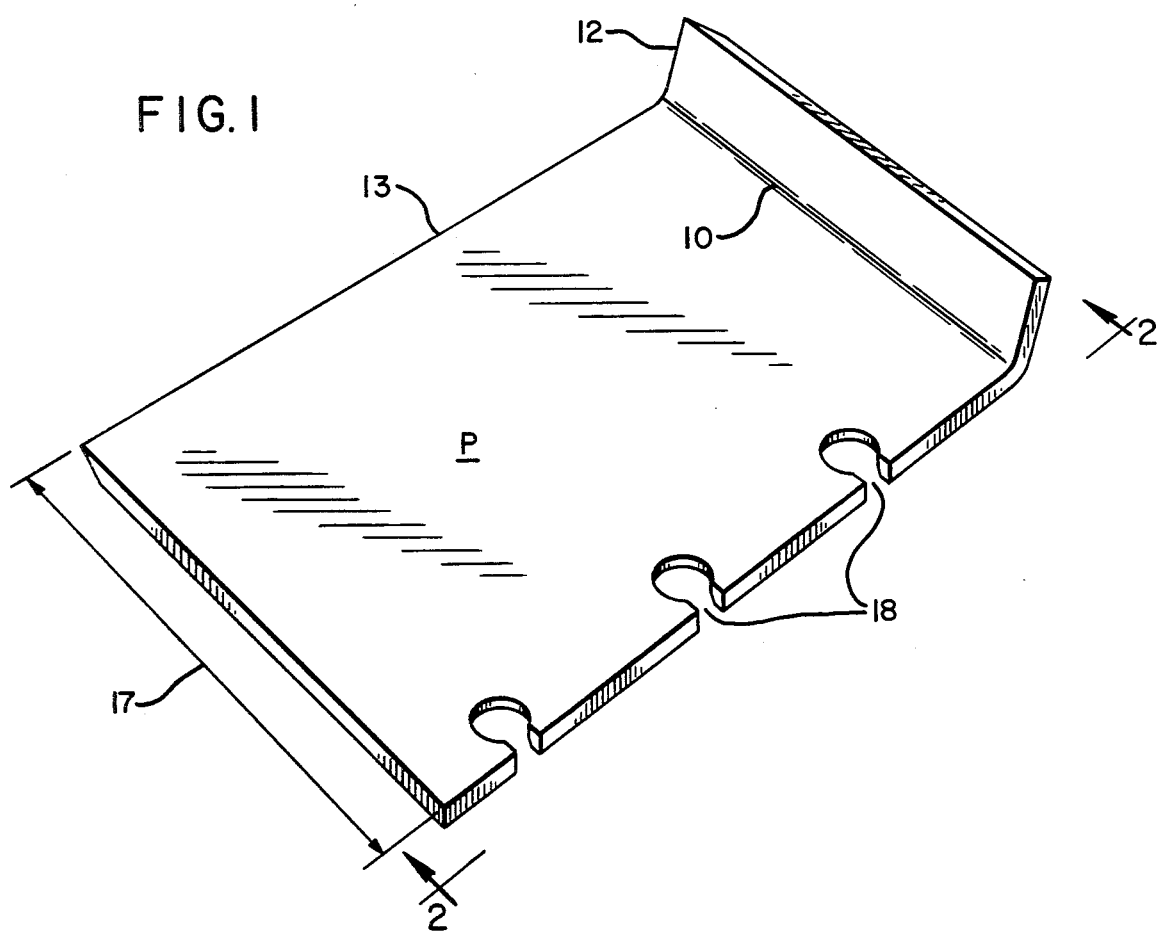
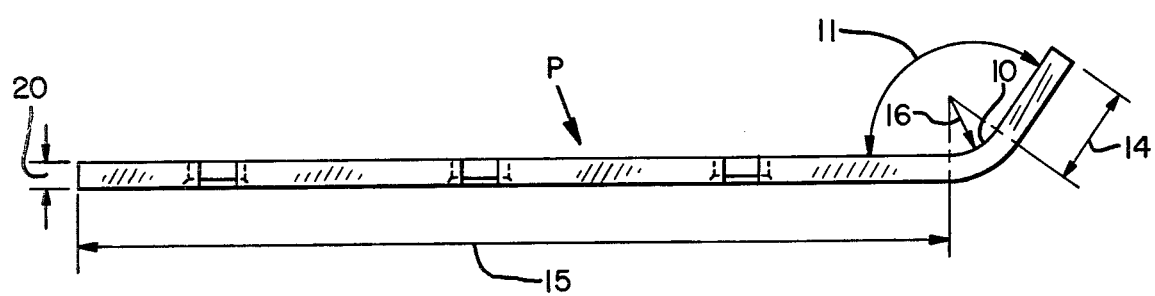

PROCESS FOR MANUFACTURING BENT KNIVES

BACKGROUND OF THE INVENTION

This invention relates to an improved process for manufacturing bent knives for certain wood cutting machines such as long slabbing chippers and lumber edging chippers.

For example, a log slabbing chipper having a plurality of bent knives is illustrated in my U.S. Pat. No. 4,082,127. The knives in such machines must be removed for sharpening and when they cannot be sharpened further they must be replaced with new knives. Thus the cost of knives is a substantial factor in the cost of operating the machine. This cost is often increased by breakage of the knives, such breakage frequently occurring in the bend in the knife.

The conventional sequence of steps of manufacturing such knives is to cut the steel to size, semi-finish, heat and form to a specified angle of bend wherein the bend line is transverse to the cutting edge, heat treat as necessary and, finally, finish grind the flat faces. The operation of finish grinding the flat surfaces is difficult because according to conventional practice it must be done after forming to the bent shape in order to correct any error in the formed angle of the knife and correct distortions in the bend. Any such angular error and distortion in the forming step must be corrected in the finish grind step.

Because of the thickness of conventional knives they are too stiff to conform to the angle of the holder when clamped in position in a machine if there is any error in the angle of the bend in the knife. Accurate positioning of the knives is essential to the proper operation of the machine.

Objects of the present invention are, therefore, to provide an improved process for manufacturing bent knives in wood cutting machines, to provide a process which is less difficult and expensive than the conventional process, to provide a process which produces knives that are less subject to breakage, and to provide a process in which the operation of finish grinding the flat surfaces may be performed before the bending operation.

SUMMARY OF THE INVENTION

In the present process the heretofore difficult finish grinding operation is performed very quickly and easily on a flat plate prior to the bending operation. This is made possible by reducing the thickness of the knife to provide a sufficiently high ratio of bend radius to thickness to reduce grain distortion in the metal and significantly reduce breakage through the bend while at the smae time allowing the plate to be bent to the required angle after, instead of before, the finish grinding operation.

It is difficult in any process for manufacturing bent knives to avoid slight errors in the formed angle of the bend. With the present process the knife is flexible enough to conform to the holder whereas the greater thickness of conventional knives makes them too stiff to conform to the angle of the holder, which itself may be subject to slight variations in the angle. Thus the present process not only reduces the initial cost of the knives but also reduces theoccurrence of knife breakage during the operation of the machine, thereby reducing down time and operating costs in general.

The invention will be better understood and additional objects and advantages will become apparent from the following detailed description of the invention with reference to the accompanying drawing. Various changes may be made in the details of the process and certain features may be used without others. All such modifications within the scope of the appended claims are included in the invention.

BRIEF DESCRIPTION OF THE DRAWING

FIG. 1 is a perspective view of a bent knife manufactured according to the invention.

FIG. 2 is a view on the line 2—2 in FIG. 1.

DESCRIPTION OF THE PREFERRED EMBODIMENT

By way of example, a bent knife is illustrated and described for use in the log slabbing chipper described in said Pat. No. 4,082,127. The knife is made from a flat rectangular plate P having a bend line at 10 which forms an angle 11 of 125°. One edge of plate P is sharpened on a 30° bevel to provide a short planing edge 12 and a longer chip cutting edge 13 as described in said patent.

In this particular machine the dimension 14 is one and thirteen sixty-fourths inches and the dimension 15 is eight and forty-five sixty-fourths inches in order to fit the knife holders in the machine. The inside radius 16 of the bend is nine-sixteenths inch. The length dimension 17 is six and three-eights inches.

Counter-sunk keyhole slots 18 retain three babbitt metal shims which extend the effective length of dimension 17 to six and one-half inches. Each time the knife is sharpened, new babbitt fillings are installed to maintain the six and one-half inch dimension constant throughout the life of the knife as described in said patent. The invention is not limited however to the specific dimensions and the other values given above merely by way of example.

Heretofore, such knives have been manufactured by cutting a flat steel plate P to size, semi-finishing the plate on both sides, heating the plate, forming the bend 10 to the specified angle 11 and then heat treating as necessary. The last step was finish grinding of the flat surfaces, which had to be done after forming to insure that the angle 11 is accurate. With the thickness of plate P heretofore used, which was exclusively three-eights inch at dimension 20, the knives were too stiff to conform to the angle 11 of the knife holders in the machine if the knives were not bent quite accurately to such angle.

Thus there was no alternative to performing the finish grinding of the flat surfaces as thelast step of the manufacturing process in order to insure the accuracy of angle 11. The difficulty of accurately performing such finish grinding is obvious from the shape illustrated.

The difficulty in grinding the flat surfaces after forming the bend 10 is not only the result of having to support the knife in several different positions but also comes from the need for maintaining a grinding wheel contour which will form an accurate radius on the inner and outer surfaces of the bend. This is necessary in order to nest the knives together properly for sharpening, and subsequently re-sharpening, a plurality of the knives in a single operation. Bending the plate stock of conventional thickness produced severe distortions in the inner and outer bend surfaces which had to be corrected.

The present improved process is made possible by reducing the knife thickness dimension 20 to one-fourth inch or less. When this is done, the process is simplified to that of cutting the plate P to size, finish grinding the opposite flat faces accurately to the desired thickness dimension 20, rough grinding the bevelled cutting edge, heating and forming to the specified angle 11, performing the heat treatment operation, and then finish grinding the cutting edges 12 and 13. The finish grinding of cutting edges 12 and 13 after bending the plate is not a difficult operation since a plurality of the knives may be nested together for simultaneous sharpening in this step.

A knife of this thickness is flexible enough to conform to the holder in the machine in spite of unavoidable slight errors in the formed angle 11 and possible variations in the corresponding angle in the holders. There are no objectionable distortions in the inner and outer bend surfaces to be ground away. Manufacturing labor cost is reduced by one-half.

Also, the advantages to the user are several. The present high ratio of bend radius to thickness substantially eliminates breakage through the bend by reducing grain distortion in the metal of the knife. Knives according to the present process are easier to grind in resharpening, easier to handle and less expensive. Being thinner, heat treatment is more uniform, increasing the life of the knife.

The knife holders in the machine are adapted to receive the present thinner knives by merely inserting ⅛ inch thick shims in the knife holders.

The present improvement is directly related to the large ratio of inside bend radius 16 to thickness 20. In the conventional knife these values are respectively nine-sixteenths inch and three-eights inch, giving a ratio of 1.50. In the present knife these values are respectively nine-sixteenths inch and one-fourth inch, which gives a ratio of 2.25. It is possible to increase this ratio still further by slightly further reducing the thickness 20. The expressed ratio of 2.25 is also applicable to knives for other similar machines which may have somewhat different values for the angle 11, radius of curvature 16 and thickness 20.

What is claimed is:

1. The process of manufacturing a bent knife for a wood cutting machine wherein the knife is bent transversely of its cutting edge to a predetermined angle with a predetermined inside radius of bend, comprising the steps of providing a flat metal plate, finish grinding the opposite faces of said plate to a plate thickness that will provide a ratio of inside bend radius to plate thickness not less than 2.25, rough grinding a bevelled cutting edge on one edge of said flat plate, heating and bending said plate transversely of said cutting edge to said predetermined angle of bend, heat treating the bent plate, and finish grinding said cutting edge.

2. A bent knife manufactured according to the process of claim 1.

3. The process of claim 1 wherein said angle of bend is approximately 125°, said inside radius of bend is approximately 9/16 inch, and said plate thickness is approximately ¼ inch.

4. A bent knife manufactured according to the process of claim 3.